United States Patent
Boissel et al.

(10) Patent No.: US 6,625,210 B1
(45) Date of Patent: Sep. 23, 2003

(54) METHOD FOR MAKING A CALL IN A MULTIPLE BIT-RATE CHANNEL CORRESPONDING BIT-RATE SWITCHING PROCEDURE AND TRANSMISSION NETWORK

(75) Inventors: Guy Boissel, Pleumeur-Bodou (FR); Christophe Connan, Ploumagoar (FR); Marie-Joelle Pasche, Minihy Treguier (FR); Jacques Savona, Servel (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/459,045

(22) Filed: Dec. 10, 1999

(30) Foreign Application Priority Data

Dec. 15, 1998 (EP) .............................................. 98460058

(51) Int. Cl.[7] .................................................. H04M 7/00
(52) U.S. Cl. ........................ 375/222; 370/236; 379/229
(58) Field of Search ................................ 375/222, 219, 375/221, 225, 260; 370/465, 235, 236, 358; 379/90.1, 229

(56) References Cited

U.S. PATENT DOCUMENTS 5,987,061 A * 11/1999 Chen ........................ 375/222

6,498,808 B1 * 12/2002 Tzannes ..................... 375/225

FOREIGN PATENT DOCUMENTS

| EP | 0 647 043 A2 | 9/1994 | ............. H04L/1/12 |
| WO | WO 95/35002 | 12/1995 | ............. H04Q/7/24 |

OTHER PUBLICATIONS

European Search Report, date May 18, 1999.

* cited by examiner

Primary Examiner—Amanda T. Le

(57) ABSTRACT

A method (10) is provided of setting up a call over a multiple bit-rate transmission channel between a central module (25) and a remote module (22). The channel comprises at least one first transmission channel (401) having a primary bit rate and at least one second transmission channel (402) having a secondary bit rate. Each of said first and second transmission channels is a two-way channel comprising a first transmission half-channel (43, 45) in one direction and a second transmission half-channel (44, 48) in another direction. The method comprises the following steps: setting up a call on the primary transmission channel, scanning for a signal indicating a secondary bit-rate requirement, and if a signal indicating a secondary bit rate requirement is detected, bit-rate switching from said first transmission channel (401) to the second transmission channel (402). The switching is undertaken at different points in time for said first transmission half-channel (43, 45) and said second transmission half channel (44, 48).

18 Claims, 4 Drawing Sheets

METHOD FOR MAKING A CALL IN A MULTIPLE BIT-RATE CHANNEL CORRESPONDING BIT-RATE SWITCHING PROCEDURE AND TRANSMISSION NETWORK

CROSS-REFERENCE TO RELATED APPLICATION

This application claims priority of European Patent Application No. 98460058.5, which was filed on Dec. 15, 1998.

BACKGROUND OF THE INVENTION

1. Field of the Invention

The field of the invention is that of methods for the transmission of telephone calls in multiple bit-rate transmission channels.

The invention can be applied especially to the case of multiple bit-rate links set up between a central station and the remote peripheral stations of a network in a star or hub-and-spoke configuration.

2. Description of the Related Art

A network of this kind corresponds for example to <<rural>> telephony infrastructures, typical in regions that are under-equipped in wire or cabled networks and/or have a low density of potential subscribers.

It can be applied especially when a terminal involved in a communication using a network of this kind may require resources with different bit-rates depending on whether it is seeking, for example, to set up either a simple voice call or a transfer of data of the type requiring action by a modem (for example for a connection on an <<internet>> type open network. In this case, indeed, a voice call will require a lower transmission bit rate than a data transfer.

A first known approach consists in routinely providing a bit rate that is capable of coping with the highest resource requirement. However, this approach means under-utilization of the transmission channel since, in the case of simple voice calls for example, the allocated transmission bit rate will be far greater than needed.

A second approach consists of the use of a multiple bit-rate channel to transmit this type of call. However, those skilled in the art are dissuaded from using this technique because of the complexity of the procedures for allocating existing bit rates, which are not compatible with the constraints of communications involving modems, especially in the vital initial stages of setting up calls and of inter-modem negotiation.

Indeed, a change in the bit rate of the line allocated as a function of need implies the implementation of bit-rate switching procedures, to increase or reduce the bit rate allocated to the demand. However, a classic switching of the transmission channel entails the risk that the bit-rate switching is not exactly simultaneous and synchronized in both directions of transmission. The disturbance resulting therefrom is indeed likely to abort the procedure for setting up communications between the modems, and this risk cannot be tolerated in the context of a switching service which is expected to show reasonable reliability and efficiency with a success rate close to 100% when the communications are set up.

The call procedure between two modems, one of them being with a multiple bit-rate telephone subscriber (calling or called subscriber), can be subdivided into four phases:

making the 32 kbit/s call;

connecting the two modems;

procedure for negotiating the speed of transmission between the two modems;

transfer of the data elements.

In accordance with recommendation V25, the modem connection phase can be subdivided as follows:

the calling modem, after getting linked up and dialling the number, sends an uninterrupted call tone to the called modem;

the called modem takes the call, gets connected to the line and, after a silence, sends the response tone constituted by a continuous signal at 2100 Hz;

as the case may be, the modems can deactivate network echo cancellers and/or suppressors devices, by making or not making phase reversals at regular intervals (typically every 450±25 ms), as specified in the G164 and G165 recommendations.

the calling modem, after recognizing the answering tone, waits for reception of a silence of 75±25 ms coming from the called modem, and then goes into the negotiation phase. To accelerate the procedure, this calling modem can inform the called modem that it has recognized its reponse by sending it a response tone of the calling modem: in recognizing this signal, the called modem stops sending the response tone and then, after 75±20 ms of silence, goes into the negotiation phase.

In the absence of response signal of the calling modem, the called modem sends the response tone for 3,3 s±0,7 s, then after 75±20 ms of silence goes into the negociation phase.

To enable the modems to work with an optimum bit rate, the switching of the bit rate (namely the changing of the transmission channel) must be ended before the beginning of the procedure of negotiation between the modems.

This means that the following conditions should be met, in assuming the most unfavorable case, namely the setting up of a call with a minimum-duration response signal of the called modem:

i—the response of the called modem should not be interrupted for a duration of more than 55 ms, otherwise the calling modem could go into the negotiation phase;

ii—no action (such as a bit-rate switching operation) on the response half-channel of the called modem should take place after the lapse a certain period of time starting from the response tone on the line, beyond which the phase of negotiation is automatically started (655 ms in the case of an operation of neutralization of the echo suppressors only, 1 255 ms in the case of a neutralization of the echo cancellors and suppressors);

iii—any action must also take place after approximately 950 ms, i.e. for the duration of at least two phase reversals, should the modems seek to neutralize both the echo cancellors and the suppressors.

SUMMARY OF THE INVENTION

The invention forms part, especially, of this context of constraints that could be contradictory.

Thus, it is a first goal of the invention to put forward the novel problem of the default allocation, at each request for setting up a call, of a minimum transmission bit rate, although this bit rate is paradoxically insufficient for certain types of communication available to the subscriber.

A complementary goal is to provide a call setting-up procedure that makes it possible to optimize resource allocation by the authorizing, at request, of the allocation of a bit rate higher than the bit rate allocated by default.

Another goal of the invention is to provide a bit-rate allocation procedure of this kind that is compatible with the severe constraints dictated by the procedures for setting up calls between two modems.

It is also a goal of the invention to provide a bit-rate allocation procedure that does not require the addition of a piece of information or the processing of a piece of information supplementary to the items of information presently available in standard call-making procedures and that is activated in particular without any advance knowledge of the nature of the transmission requested by the user or any advance knowledge of the transmission bit rate required by his call.

It is a goal of the invention therefore to provide a solution that meets at least the case where the modems seek to neutralize both the echo cancellers and the echo suppressors during the connection phase when the bit-range switching according to the invention comes into play.

These different goals as well as others that shall appear hereinafter are achieved according to the invention by means of a call setting-up procedure with bit-rate allocation in a multiple bit-rate transmission channel enabling the routing of a call between a central module and a remote module, of the type comprising at least one first transmission channel at a primary bit rate and at least one second transmission channel at a secondary bit rate, a procedure in which said first and second transmission channels are two-way channels, namely channels constituted by a first transmission half-channel in a first direction of communication and a second transmission half-channel in a second direction of communication, a procedure wherein said call setting-up procedure comprises the following successive phases:

a phase for setting up a call, by default, on a primary bit-rate transmission channel, a phase of listening and searching for a signal indicating a secondary bit-rate requirement and, assuming the detection of a signal indicating a secondary bit-rate requirement, a phase of bit-rate switching from said first primary bit-rate transmission channel to a second secondary bit-rate transmission channel, said switching being done at different points in time for said first transmission half-channel and for said second transmission half-channel.

In other words, the general principle of the invention thus relies on the passage of an ongoing call from a transmission of data on a first channel at a bit rate with a first value (called a primary bit rate) to a transmission of data on a second channel at a bit rate with a second value (called a secondary bit rate). To obtain this passage, certain conditions have to be fulfilled to bring about the sending, for example by the remote module, of a signal enabling the identification of a secondary bit-rate requirement. It is the detection, for example by the central module, of this signal indicating a secondary bit-rate requirement that prompts the activation of the bit-rate switching phase.

Hereinafter, in the present description of the patent, the term (<<half-channel >> is understood to mean a one-way channel, namely a channel on which the central module receives or sends data from or to a remote module at a given bit rate.

It will be noted that the switching phase takes account especially of the capacities offered by the transmission network. Consequently, the switching phase may be adapted to a large number of configurations of the transmission network. An adaptability of this kind therefore provides great flexibility with respect to the implementation of the method of the invention.

In a preferred mode of operation of the invention in which the central module and the remote module work together with at least one communications modem, said signal indicating a secondary bit rate requirement is sent by one of said modems.

Advantageously, said procedure comprises a complementary phase for the connection of said modems, during which:

the calling modem sends a call tone to the called modem, then;

the called modem sends a response tone to the calling modem during a predetermined and uninterrupted period of time, at the end of which there is a phase of negotiation between said modems, said switching phase comprising the following steps:

a step of activation of a first time lag starting from said detection of a signal indicating a secondary bit-rate requirement, a first step for the switching of the call, for the half-channel corresponding to the direction of reception by the remote module, from the primary bit-rate transmission half-channel to the secondary bit-rate transmission half-channel, and, at the end of the first time lag, a second step for the switching of the call, for the half-channel corresponding to the direction of sending by the remote module, from the primary bit-rate transmission half-channel to the secondary bit-rate transmission half-channel, said first time lag having a duration smaller than said predetermined and uninterrupted time period, at the end of which there is a phase of negotiation between said modems.

In other words, the observation of the first time lag activated to pass (from a primary bit-rate data transmission channel) to a secondary bit-rate data transmission channel does not disturb the normal operation of the data exchanges between the models when communication is in progress.

Preferably, with said procedure providing for a step of implementation of a function requiring a predetermined implementation time, said first time lag has a duration greater than said predetermined implementation time.

A duration such as this of the first lime lag enables the step to implement a function to be carried out without interrupting it while it is being carried out.

Advantageously, said step for the implementing of a function requiring a predetermined implementation time is a step for the deactivation of network echo suppressors and/or cancellers.

In other words, the duration of the first time lag makes it possible especially to carry out two phase changes to neutralize network echo cancellers.

According to a preferred mode of operation of the invention, in which said first and second steps for the switching of said half-channels imply elementary switching operations between call connection and routing modules, said elementary switching operations imply call interruptions with a duration below a predetermined threshold.

Thus, the modems are prevented from interpreting a disturbance such as this as a signal of passage to the negotiation phase.

Preferably, said first and second switching steps include operations for the Y connections of a secondary bit-rate transmission half-channel in parallel with a primary bit-rate transmission half-channel, prior to a full substitution of said secondary bit-rate transmission half-channel for said primary bit-rate transmission half-channel.

Connection operations of this kind especially prevent any loss of data transmitted during the call.

It will be understood that, for needs of synchronization between the central module and the remote module, connection operations of this kind will take place, in a first stage, in the direction of reception by the remote module and then, in a second stage, in the direction of sending by the remote module.

Advantageously, said procedure furthermore comprises a step for the incrementation of a counter of failures of said procedure in at least one of the situations belonging to the group comprising:

the occupation of all of said transmission channels at a secondary bit rate;

the reception by said central module of a message reporting that it was not possible for said first switching step to be carried out by said remote module.

In one particular mode of operation of the invention, said modems work according to the V25 recommendation.

According to a particular mode of operation of the invention, said signal indicating a secondary bit rate requirement is constituted by a 2100 Hz tone.

Preferably, said procedure meets at least one of the following approximate temporal values:

said predetermined, uninterrupted time period ranges from 400 to 1255 ms;

said first time lag is in the range of about 800 ms approximately;

said function requires a predetermined implementation time necessitating a time of about 950 ms;

said interruptions of calls with a duration below a predetermined threshold are in the range of about 55 ms at most.

Advantageously, said secondary bit rate is higher than said primary bit rate.

Clearly, it is when the primary bit rate allocated by default is a low bit rate, increased only in the event of the detection of a higher secondary bit-rate requirement, that the invention finds a preferred application, providing for an optimizing of the allocation of the bit-rate resources available.

In one particular mode of operation of the invention, said secondary bit rate is equal to 64 kbit/s and said primary bit rate is 32 kbit/s.

According to a particular mode of operation of the invention, the link between said central module and said remote module is an RF link of the type with connection of telephone subscribers by radio concentration.

Preferably, said central module is constituted a central communications station managing the retransmission of the calls, and said remote module is a terminal station.

Advantageously, said call is transmitted according to PCM encoding techniques.

The invention also relates to a switching method of the type implemented especially in the call setting-up procedure as described here above.

The invention also relates to a transmission network implementing the call setting-up procedure as described further above.

BRIEF DESCRIPTION OF THE DRAWINGS

Other features and advantages of the invention shall appear from the following description of a preferred mode of operation of the invention, given by way of a non-restrictive example and from the appended drawings, of which.

DETAILED DESCRIPTION

The present invention therefore relates to a method for setting up a call, within a data transmission network, in a multiple bit-rate transmission channel, between a central module and a remote module, enabling the increase, in the network, of the number of calls for a fixed total data bit rate.

Hereinafter in the description, we shall consider the case of a telephone transmission network in which the modules, especially the central and remote modules, each co-operate with an electronic modulation/demodulation module also known as a modem. In the mode of operation presented, the call setting-up procedure consists in obtaining a switching of the transmission from an economical channel with reduced bit rate to a channel with higher transmission bit rate as soon as the system has detected the presence of a modem in the call that is being set up.

Figure 1:
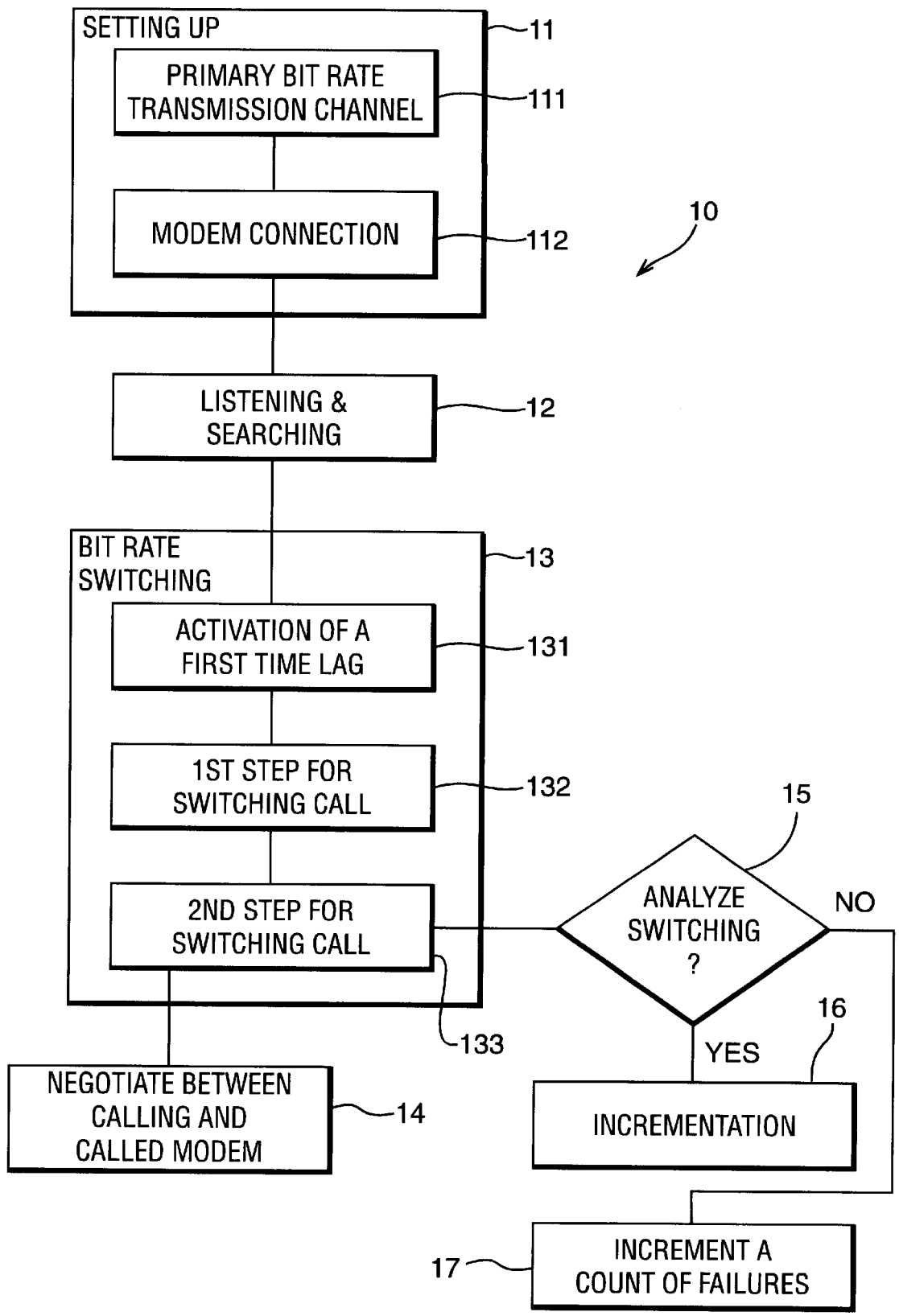
FIG. 1 is a simplified flow chart of a particular mode of operation of a procedure, according to the invention, for making a call between a central module and a remote module.

This switching forms part of a call setting-up procedure as shown schematically in FIG. 1 and described hereinafter.

In a standard way, the procedure for setting up a call with allocation of a transmission channel having a given bit rate in a multiple bit-rate transmission channel enables the routing of a call between a central module and a remote module within a transmission network. To do this, the multiple bit-rate transmission channel comprises at least one first data transmission channel working at a primary bit rate and at least one second data transmission channel working at a secondary bit rate. Each of the first and second data transmission channels comprises both directions of communication. Thus, a first half-channel operates for example in sending data from a central module to a remote module, and a second half-channel operates, for example, in sending data from a remote module to the central module.

It may be recalled that an allocation of a transmission channel is associated routinely with an allocation of a half-channel in the direction of sending by the remote module followed by an allocation of a half-channel in the direction of reception by the remote module.

According to the invention, the call setting-up procedure 10 comprises:

a phase 11 for the setting up, by default, of a call on a primary bit-rate transmission channel. The transmission of the data elements can be undertaken 111 on the first primary bit-rate transmission channel following, for example:

the detection of a ringing sent by the central module and then a connection of the remote module to the line corresponding to the first primary bit-rate transmission channel;

or the detection of a call being taken and a number being dialled by a subscriber provided with a distant module, then a connection of the central module to the line corresponding to the first primary bit-rate transmission channel;

a phase 12 of listening and searching for a signal indicating a secondary bit-rate requirement. This phase 12 is for example a cyclical scanning of the data elements on a predetermined transmission channel on which the central module awaits a signal having predetermined specific characteristics; and, assuming the detection of a signal indicating a secondary bit-rate requirement, a phase 13 of bit-rate switching from said first primary bit-rate transmission channel to a second secondary bit transmission channel, the switching being achieved at instants different for the first transmission half-channel and the second transmission half-channel. A switching of this kind can occur, especially, in a first stage on the first half-channel corresponding to the direction of reception of the distant module (working at the secondary bit rate) and then, in a second stage, on the second half-channel corresponding to the direction of reception of the central module (working at the secondary bit rate).

A procedure of this kind has the advantage of optimizing the links within the transmission network, while at the same time optimizing the use of the available resources, namely the multiple bit-rate transmission channels.

In the mode of operation presented, the signal indicating a secondary bit-rate requirement is sent by one of the modems, in this case the modem working together with the distant module.

Consequently, the procedure 10 comprises a modem-connection phase 112 during which the calling modem sends a 1200 Hz call tone (recommendation V25) to which the called modem responds with a 2100 Hz tone that is the signal indicating a secondary bit-rate requirement activating the switching procedure according to the invention, at the end of which there is a phase 14 of negotiation between the calling modem and the called modem.

The switching phase 13 proper comprises the following steps:

a step 131 for the activation of a first time lag starting with the detection of the signal indicating a secondary bit-rate requirement, for example by the calling modem;

a first step 132 for the switching of the call, for the half-channel corresponding to the direction of reception by the distant module, from the primary bit-rate transmission half-channel to the secondary bit-rate transmission half-channel;

and, at the end of the first time delay, a second step 133 for the switching of the call, for the half-channel corresponding to the sending direction by the distant module, from the primary bit-rate transmission half-channel to the secondary bit-rate transmission half-channel, the first time lag having a duration smaller than the predetermined, uninterrupted time period, at the end of which there is the phase 14 of negotiation between the calling modem and the called modem.

The first and second switching phases 132, 133 include operations for the Y connection of a secondary bit-rate transmission half-channel in parallel with a primary bit-rate transmission half-channel, prior to a complete substitution of the secondary bit-rate transmission half-channel for the primary bit-rate transmission half-channel.

In other words, the first switching step 132 consists in making:

a first Y connection, on a secondary bit-rate half-channel corresponding to the direction of reception from the distant module, within the central module;

a second Y connection, on a secondary bit-rate half-channel corresponding to the direction of sending by the distant module, within the distant module;

a change of half-channel, corresponding to the direction of reception by the distant module, within the distant module, in passing from the half-channel corresponding to the direction of primary bit-rate reception to the half-channel corresponding to the direction of secondary bit-rate reception.

As for the second switching step 133, it consists in making a change of half-channel, corresponding to the direction of sendings by the distant module, within the central module, in passing from the primary bit-rate sending half-channel (with respect to the distant module) to the secondary bit-rate sending half-channel (with respect to the distant module).

The procedure 10 furthermore comprises a first step (not shown) for the releasing of the half-channels, corresponding to the primary bit-rate reception and sending directions, in the central module. This first releasing step makes it possible in particular to reuse the implemented means for another call, if any, that is to be undertaken with a distant module which may be different from the one that has just participated in the routing of the last call (which has been the object of a change in reception and sending half-channels).

Similarly, the procedure 10 furthermore comprises a second step (not shown) for the releasing of the half-channels, corresponding to the direction of primary bit-rate reception and sending, within the distant module. This second releasing step makes it possible in particular to reuse the implemented means for another call, if any, that is to be undertaken with a central module.

Following a step 15 for analyzing the success of the switching 13, the operation passes to an incrementation step 16.

a first counter recording the number of switching(s) on the transmission channel at the secondary bit rate for a subscriber of the telephone transmission network; and/or a second counter recording the total number of switching (s) for all the subscribers of the telephone transmission network.

If not, namely if the switching phase 3 has not been performed, the procedure 10 furthermore comprises a step 17 to increment a counter of the failures of this procedure 10 in at least certain situation(s). As situation(s), they may be especially:

the occupation of all the transmission channels according to a secondary bit rate; and/or the reception by the central module of a message reporting that the first switching step has not been done by the distant module.

Figure 2:
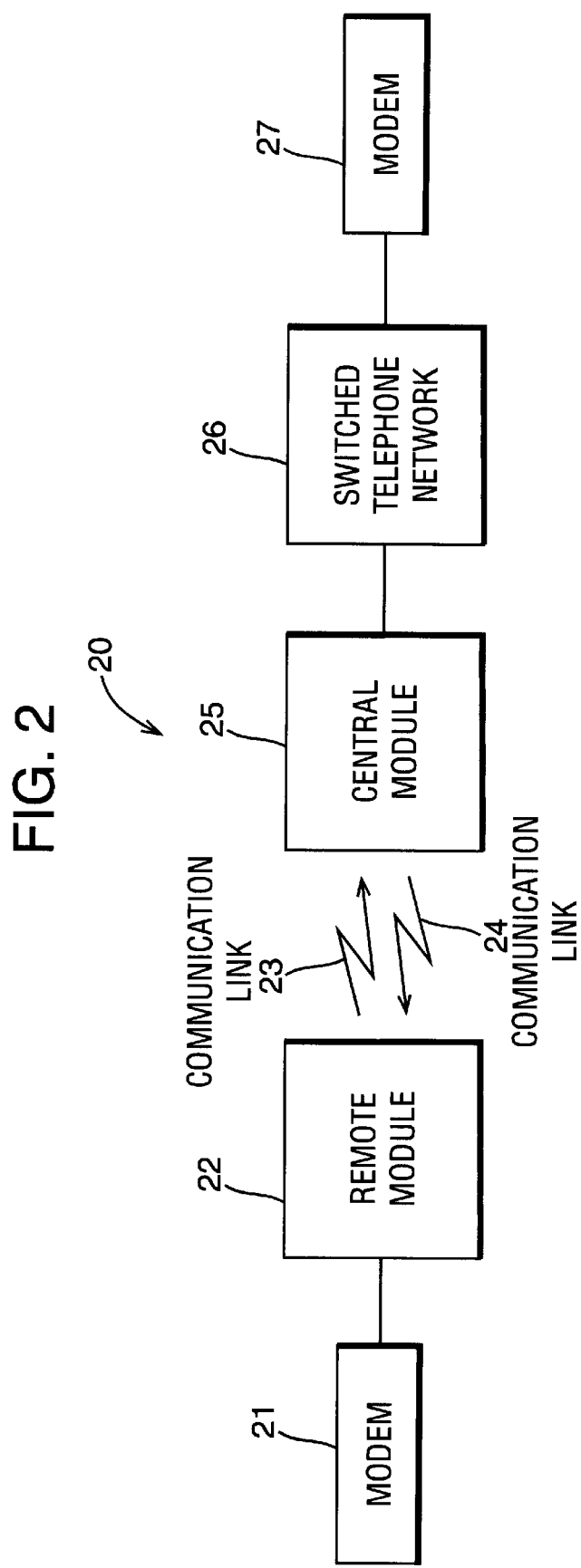
FIG. 2 illustrates a simplified diagram of a particular embodiment of a transmission network in which it is possible to implement the procedure of FIG. 1.

As can be seen in the simplified drawing of FIG. 2, a telephone transmission network 20 comprises the following means:

a modem 21 connected to a module 22, called a remote module, communicating through a link that works in both directions 23, 24 of communication with a module 25 called a central module connected to a switched telephone network 26 connected to a modem 27.

The modems 21, 27 work according to the recommendation V25.

The central module 25 is constituted especially by a central communications station that manages the shifting of the communications of the telephone transmission network that require it.

As for the remote module 22, it is constituted, for example, by a terminal station that is implemented to receive and/or send (speech and signalling) data elements towards the central module 25.

The link between the central module 25 and the remote module 22 is an RF link with connection of telephone subscribers by radio concentration corresponding to a point-multipoint system. This radio link is located, for example, in the 2.3–2.5 Ghz frequency band.

In the example described, a multiple bit-rate channel has, for the useful part of the information transmitted, a total bit rate of 2 Mbits/s possibly that may comprise 32 channels at a 64 kbit/s rate capable of taking 30 calls or 32 channels at a 32 kbit/s bit rate capable of taking 60 calls. With the aim of automatically reallocating the passband, which may be the maximum, for the transmission of telephone communications data (especially when a signal indicating a secondary bit-rate requirement has been detected), it is possible to implement the bit-rate switching phase 13 (described with reference to FIG. 1) in order to transmit two calls at a primary bit rate, corresponding for example to 32 Kbits/s of speech each, on a single transmission channel working at a secondary bit rate of 64 Kbits/s. A data compression of this kind therefore enables the passage of 60 calls at a primary bit rate of 32 Kbits/s of data elements.

These speech data elements are then transmitted (i.e. at a secondary bit rate) by a pulse coded modulation (PCM) technique whereas, previously (i.e. in data transmission at a primary bit rate), these same data elements could be transmitted by a different encoding technique such as an Adaptative Differential Pulse Coded Modulation (ADCPM).

It must be noted that the bit-rate switching phase 13 may be implemented by a call initiated by a subscriber equipped with the modem 21 to a subscriber equipped with the modem 27 as well as by a call initiated by the subscriber equipped with the modem 27 to the subscriber equipped with the modem 21. In other words, the bit-rate switching phase 13 can occur on both an outgoing call and an incoming call with respect to a subscriber of the telephone transmission network 20.

Figure 3:
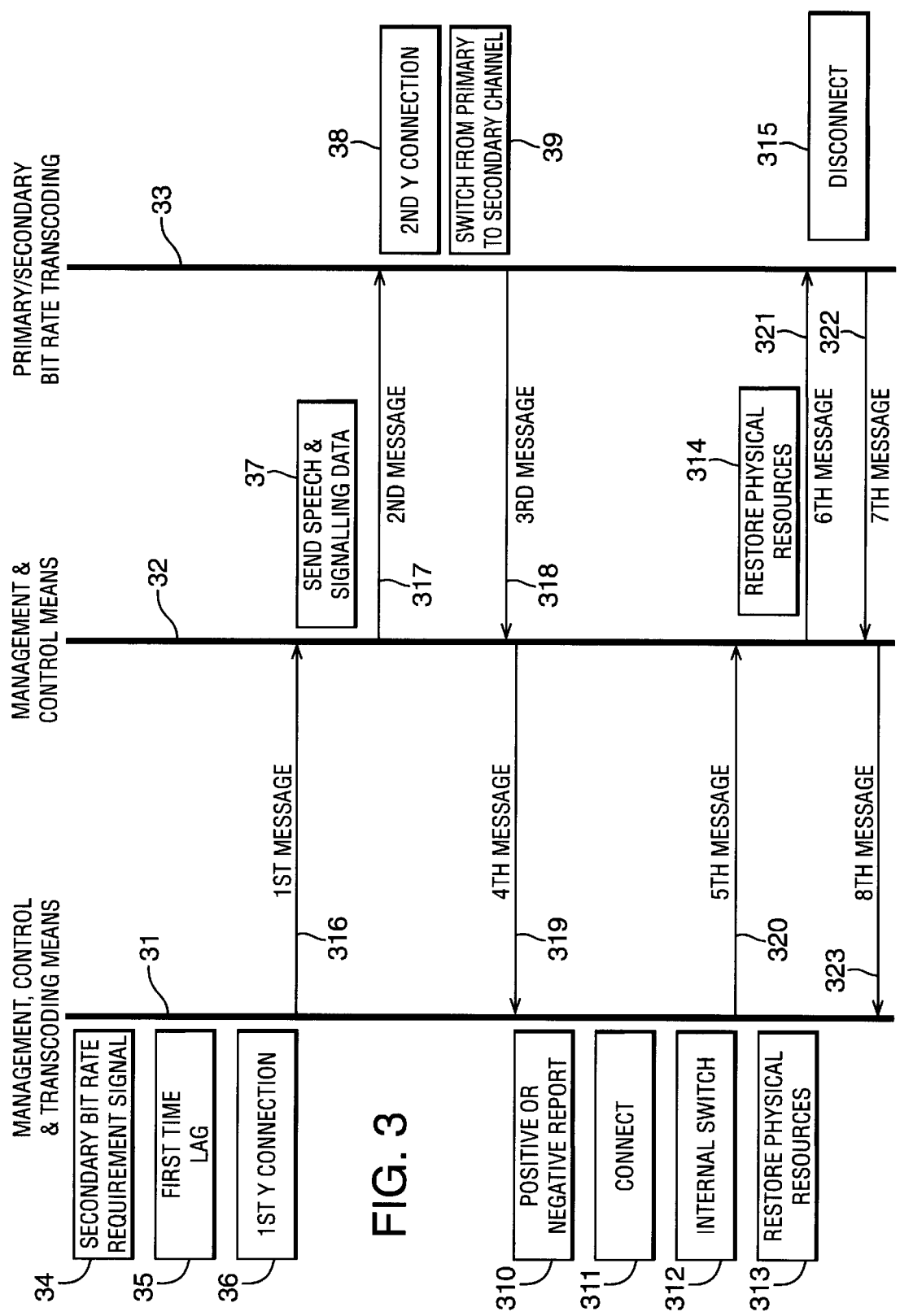
FIG. 3 is a simplified timing diagram used to explain a particular mode of achieving the procedure of FIG. 1 and implemented within the transmission network of FIG. 2.
Figure 4A:
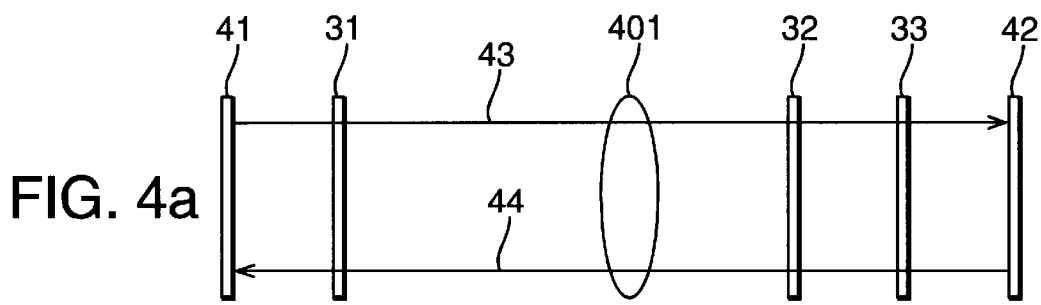
FIGS. 4a, 4b, 4c, 4d, 4e each illustrate a simplified drawing of a particular mode of elementary operations of switching between call connection and routing modules of the transmission network of FIG. 3.
Figure 4B:
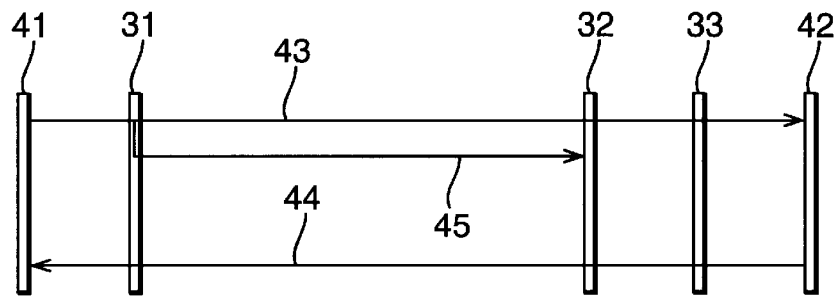
Figure 4C:
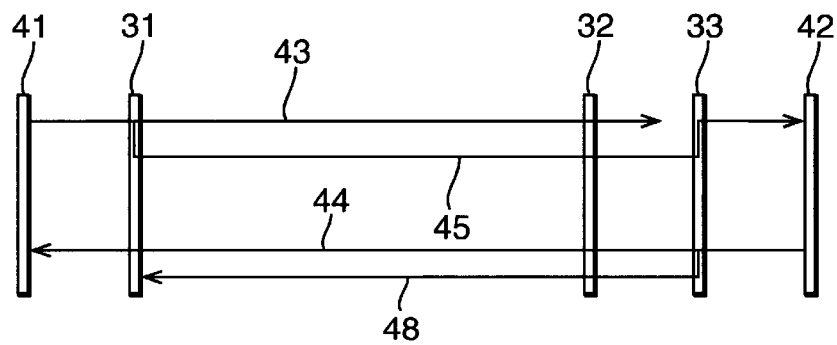
Figure 4D:
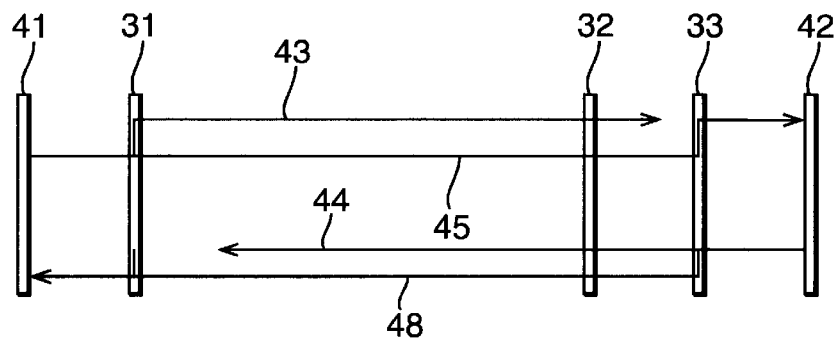
Figure 4E:
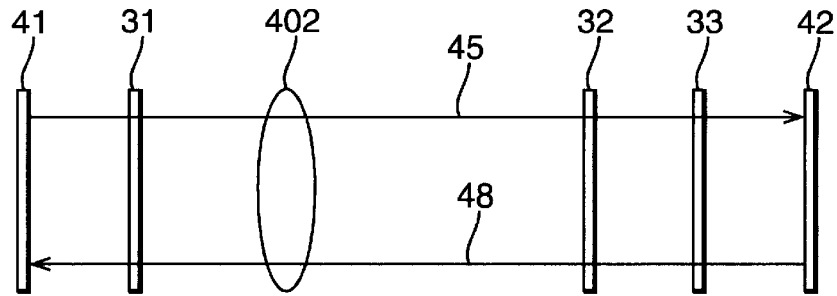

Referring to the simplified flow chart of FIG. 3, a description shall now be given of a particular mode of operation of a bit-rate switching procedure 30 according to the invention.

A description is given here below especially of the first and second steps for the switching of the transmission half-paths coming into play in the bit-rate switching procedure 30. The first and second switching steps imply especially elementary switching operations between modules for the connection and routing of the communications planned in the terminal and central stations 22, 25 described with reference to FIG. 2.

The bit-rate switching procedure 30 implements:

means 31 of management, control of all elementary operations and primary/secondary bit-rate transcoding (hereinafter known as management, control and transcoding means 31) for the central station 25;

means 32 for the management and control of the elementary operations (hereinafter known as management and control means 32) for the terminal station 22;

means 33 of primary/secondary bit-rate transcoding for the secondary bit rate of the terminal station 22;

In general, these different means 31 to 33 are the main means coming 20 into play in the sequence of the elementary operations during which they exchange especially a certain number of messages 316 to 323. The messages referenced 316, 319, 320, 323 are transmitted through a secured channel for the exchange of messages between the means 31, 32 for the management and control of the elementary operations of the central station and the terminal station respectively. The messages internal to the terminal station referenced 317, 318, 321, 322 are transmitted through elementary communications means between the management and control means 32 and the primary/secondary bit-rate transcoding means 33 of the terminal station 22.

First of all, the management, control and transcoding means 31 for the central station 25 detect (34) a signal indicating a secondary bit-rate requirement for example constituted by a continuous 2100 Hz tone, emitted by the modem 21 of the terminal station 22.

Once the 2100 Hz tone has been detected, the management, control and transcoding means 31 of the central station activate (35) a first time lag of about 800 ms, so as to enable compliance with constraint(s) with, as the case may be, an additional safety margin. A constraint is constituted, for example, by the fact of not disturbing the two changes in phase of the response signal (constituting the signal indicating a secondary bit-rate requirement sent by the called modem) necessitating a predetermined time of about 950 ms for example to deactivate echo processing means.

It will be recalled indeed that:

the detection of the signal indicating a secondary bit-rate requirement cannot be done, for example, before 200 ms following the appearance of the signal; and that the first change in phase can occur, for example, at 475 ms and the second change in phase can occur, for example, at 950 ms after the appearance of the signal. Then, the management, control and transcoding means 31 carry out an Y connection, on the half-channel corresponding to the direction of reception from the terminal station, for the speech and signalling data elements.

Then, these same management, control and transcoding means 31 of the central station send (316) a first message to the concerned terminal station reporting the <<beginning of a switching from a first 32 Kbits/s transmission channel to a second 64 Kbits/s transmission channel>>.

After the reception and processing of this first message, the means 32 for the management and control of the terminal station get connected (37) to the half-channel corresponding to the direction of reception and sending for the speech and signalling data elements.

The management and control means 32 of the terminal station inform (317) the transcoding means by a second message reporting <<a switch from a first 32 kbits/s transmission channel to a second 64 kbits/s transmission channel>>.

After the reception and processing of this second message, the transcoding means 33 of the terminal station make (38) a Y connection on the second secondary bit-rate transmission channel corresponding to the sending direction of the terminal station for the speech and signalling data elements.

Then, the transcoding means 33 make (39) a switch from the first primary bit-rate transmission half-channel to the second secondary bit-rate transmission half-channel corresponding to the direction of reception of the terminal station. An elementary switching operation of this kind prompts an interruption of the call by a duration below a predetermined threshold, for example in the range of about 55 ms at most. These means 33 then send (318) a third message providing a positive report of the start of switching towards the management and control means 32 of the terminal station, when the first switching stage has been successful.

The terminal station management and control means 32 then send (319) a fourth message providing a positive report of a start of switching (from the first primary bit-rate transmission channel to the second secondary bit-rate transmission channel) towards the management, control and transcoding means 31 of the central station.

The first time lag has a duration greater than a predetermined implementation time required for the accomplishment of a step to implement at least one function. As functions, we may refer especially to a step for the deactivation of the network echo processing means, such as echo cancellers and/or suppressors. The fact that the first time lag reaches its term makes it possible to avoid causing disturbance especially in the signal indicating a secondary bit-rate requirement (sent by the called modem) during a predetermined, uninterrupted period of time. An interrupted period of time such as this may range:

from about 400 to 655 ms in order, for example, to enable the deactivation only.of the network echo suppressors; or from about 950 to 1255 ms in order to enable, for example, the deactivation of the network echo suppressors and cancellers.

When the first time lag reaches (310) its term and if the fourth message giving report of the start of bit-rate switching is positive (providing information that the terminal station has been able to operate the bit-rate switching from a primary bit-rate transmission channel to a secondary bit-rate transmission channel), the management, control and transcoding means 31 of the central station make (311) a connection on the secondary bit-rate transmission half-channel corresponding to the direction of reception of speech and signalling data from the central station.

Negatively, i.e. when the first time lag reaches its term (310), and if the fourth message reporting on the start of bit-rate switching is negative (providing information that the terminal station has not been able to operate the bit-rate switching from a primary bit-rate transmission channel to a secondary bit-rate transmission channel), the management, control and transcoding means 31 of the central station interrupt the switching procedure. In other words, the switching procedure 30 is aborted solely when the fourth report message is negative. Consequently, the management, control and transcoding means 31 of the central station perform no additional elementary operation.

If the switching procedure (30) has not been abandoned (.e. when the first time lag reaches its term and if the fourth report message is positive) and following the elementary operation 311 described further above, the management, control and transcoding means 31 of the central station perform (312) an internal switching to the speech and signalling data reception half-channel described in detail further below. Then, these same management, control and transcoding means 31 of the central station send (320) a fifth message to the terminal station reporting the <<end of the switching from the primary bit-rate transmission channel to the secondary bit-rate transmission channel>>.

Finally, the management, control and transcoding means 31 of the central station restore (313) all the physical resources linked to the primary bit-rate transmission channel within the central station.

After reception and processing of the fifth message by the means 32 for the management and control of the elementary operations of the terminal station, these means restore (314) all the physical resources linked to the primary bit-rate transmission channel within the terminal station. To do this, these same means 32 send a sixth message to the transcoding means 33 asking them to disconnect from the primary bit-rate transmission channel.

Following the reception of this sixth message, the transcoding means 33 disconnect from the primary bit-rate transmission channel. At the end of this last-named elementary operation, these transcoding means 33 send (322) a seventh message reporting on the disconnection of the primary bit-rate transmission channel to the management and control means 32 for the terminal station. Finally, these means 32, in turn, send an eighth message report to the central station on the end of the switching of the primary bit-rate transmission channel to the secondary bit-rate transmission channel.

An explanation is now given, with reference to each simplified drawing of FIGS. 4a, 4b, 4c, 4d, 4e of a particular mode of elementary operations of switching between the call connection and routing modules according to the invention.

In general, the connections 43 to 410 implemented during the bit-rate switching procedure 30 furthermore use the means 31 to 33 already described here above, especially:

means 41 for the connection of subscriber(s) of the central station managing the physical equipment of subscriber (s) within the central station; and means 42 to connect a subscriber of the terminal station managing the physical equipment to the subscriber within the terminal station.

Also in general, the arrows shown in FIGS. 4a to 4e are transmission channels on which the speech and signalling data are conveyed.

It will be recalled that in digital data transmission according to the TDMA (Time Division Multiple Access) technique, a transmission channel is constituted by the recurrence of a given time interval in the radio multiplex sent from the central station to the terminal stations.

During a preliminary call setting-up phase (cf. FIG. 4a), a first primary bit-rate transmission channel 401 is set up between, on the one hand, the means 41 for connecting a central station and, secondly, the means 42 for connecting a terminal station concerned by the call. This first primary bit-rate transmission channel comprises, firstly, a first half-channel 43 corresponding to the direction of reception by the primary bit-rate terminal station (enabling the transmission of data from the central station to the terminal station) and, secondly, a second half-channel 44 corresponding to the direction of sending by the primary bit-rate terminal station (enabling the transmission of data from the terminal station to the central station).

Following a call set up on the first primary bit-rate transmission channel (cf. FIG. 4b), the elementary operation referenced 36 (cf. FIG. 3) consists in making a first Y connection, on a transmission half-channel 45 corresponding to the direction of reception by the secondary bit-rate terminal station, from the management, control and transcoding means 31 to the management and control means 32 of the terminal station.

Then (cf. FIG. 4c), in the elementary operation referenced 39 (cf. FIG. 3), the primary/secondary bit-rate transcoding means 33 of the terminal station make:

firstly, a second Y connection on a secondary bit-rate half-channel 48 corresponding to the direction of sending by the terminal station, and secondly, a substitution of the secondary bit-rate half-channel 45 for the primary bit-rate half-channel 43 corresponding to the direction of reception by the terminal station.

Finally (cf. FIG. 4d), in the elementary operations referenced 311 and 312 (cf. FIG. 3), the management, control and transcoding means 31, when the time lag activated after the detection of the 2100 Hz tone has reached its term, make:

firstly, a connection on the secondary bit-rate half-channel 48 corresponding to the direction of sending by the terminal station, and secondly, a substitution of the secondary bit-rate half-channel 48 for the primary bit-rate half-channel 44 corresponding to the direction of sending by the terminal station.

Following the restitution of the physical resources related to the first primary bit-rate transmission channel by the central and terminal stations (cf. FIG. 4e), the data elements are transferred solely through a secondary bit-rate transmission channel 402 (comprising the half-channel 45 corresponding to the direction of reception by the secondary bit-rate terminal station and the half-channel 48 corresponding to the direction of sending by the secondary bit-rate terminal station).

The mode of operation described here above does not seek to limit the scope of the invention to which, therefore, it is possible to make many modifications without departing from its framework. In particular, it will be noted that the bit-rate switching phase 13 (described especially with reference to FIG. 1) may take forms different from those described.

What is claimed is:

1. A method of setting up a call over a multiple bit-rate transmission channel between a central module and a remote module, the channel comprising at least one first transmission channel having a primary bit rate and at least one second transmission channel having a secondary bit rate, each of said first and second transmission channels being a two-way channel comprising a respective first transmission half-channel in one direction and a respective second transmission half-channel in another direction, the method comprising the steps of:

setting up a call on the first transmission channel, scanning for a signal indicating a secondary bit-rate requirement, and if a signal indicating a secondary bit rate requirement is detected, bit-rate switching from said first transmission channel to the second transmission channel, the switching being undertaken at different points in time for said first transmission half-channels and said second transmission half channels.

2. The method according to claim 1, in which the central module and the remote module are each connected to a respective communications modem, said method comprising the step of:

indicating with said signal the secondary bit rate requirement is sent by one of said modems.

3. The method according to claim 2, comprising for the connection of said modems, the steps of:

sending by the calling modem a call tone to the called modem, receiving from the called modem a response tone to the calling modem during a predetermined and uninterrupted period of time, then there is negotiation between said modems, and wherein said switching phase comprising the steps of:

activating a first time lag starting from said detection of the signal indicating secondary bit-rate requirement, switching of the half-channel corresponding to the direction of reception by the remote module, from the primary bit-rate transmission half-channel to the secondary bit-rate transmission half-channel, and, at the end of said first time lag, switching of the half-channel corresponding to the direction of sending by the remote module, from the primary bit-rate transmission half-channel to the secondary bit-rate transmission half-channel, said first time lag having a duration smaller than said predetermined and uninterrupted time period, at the end of which there is said negotiation between said modems.

4. The method according to claim 3, comprising the step of requiring a predetermined implementation time, wherein said first time lag has a duration greater than said predetermined implementation time.

5. The method according to claim 4, wherein said requiring step comprising the step of function deactivating of network echo suppressors and/or cancellers.

6. The method according to claim 3, in which said switching of said half-channels comprising elementary switching operations between call connection and routing modules, wherein said elementary switching operations comprising the step of calling interruptions with a duration below a predetermined threshold.

7. The method according to claim 6 comprising the steps of:

having a predetermined implementation time necessitating a time of about 950 ms; and providing said interruptions of calls with a duration below a predetermined threshold are in the range of about 55 ms at most.

8. The method according to claim 2 wherein said modems operate according to the V25 recommendation.

9. The method according to claim 3, wherein at least one of the following approximate temporal values applies:

said predetermined, uninterrupted time period ranges from 400 to 1255 ms;

said first time lag is in the range of about 800 ms.

10. The method according to claim 1, wherein said switching of said half-channels comprising the step of providing connections of the secondary bit-rate transmission half-channel in parallel with a primary bit-rate transmission half-channel, prior to a full substitution of said secondary bit-rate transmission half-channel for said primary bit-rate transmission half-channel.

11. The method according to claim 1, comprising the step of incrementating of a counter of failures of said method in at least one of the following situations:

occupation of all of said transmission channels at a secondary bit rate;

reception by said central module of a message reporting that it was not possible for said first switching step to be carried out by said remote module.

12. The method according to claim 1, wherein said signal indicating the secondary bit rate requirement is constituted by a 2100 Hz tone.

13. The method according to claim 1, wherein said secondary bit rate is higher than said primary bit rate.

14. The method according to claim 1, wherein said secondary bit rate is equal to 64 kbit/s and said primary bit rate is 32 kbit/s.

15. The method according to claim 1, wherein the link between said central module and said remote module is an RF link of the type with connection of subscribers by radio concentration.

16. The method according to claim 1, comprising the step of managing by said central module of a central communications station the retransmission of the calls, and said remote module is a terminal station.

17. The method according to claim 1, wherein said call is transmitted according to PCM encoding techniques.

18. A transmission network comprising a central module and a remote module, and means operative to set up a call over a multiple bit-rate transmission channel between the central module and the remote module, the channel comprising at least one first transmission channel having a primary bit rate and at least one second transmission channel having a secondary bit rate, each of said first and second transmission channels being a two-way channel comprising a first transmission half-channel in one direction and a second transmission half-channel in another direction, the network comprising means operative to:

set up a call on the primary transmission channel, scan for a signal indicating a secondary bit-rate requirement, and if a signal indicating a secondary bit rate requirement is detected, bit-rate switching from said first transmission channel to the second transmission channel, the switching being undertaken at different points in time for said first transmission half-channel and said second transmission half channel.

* * * * *